Figure 1:
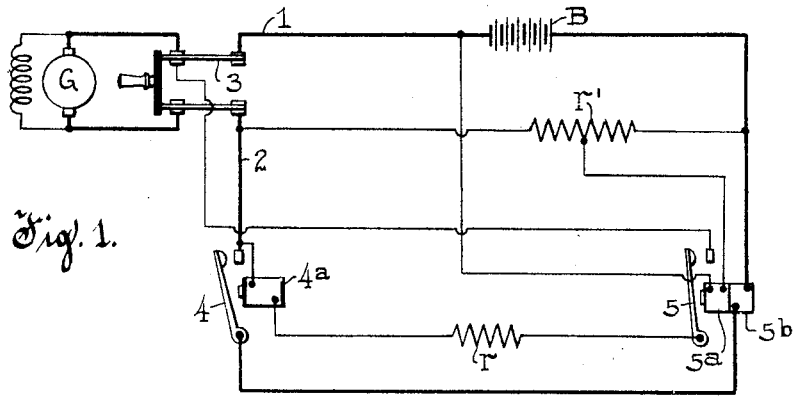

Dec. 26, 1922.

A. J. HORTON.
BATTERY CHARGING APPARATUS.
FILED JAN. 17, 1920.

1,439,893.

INVENTOR.
Albert J. Horton
BY
ATTORNEYS.

Patented Dec. 26. 1922.

1,439,893

UNITED STATES PATENT OFFICE.

ALBERT J. HORTON, OF WHITE PLAINS, NEW YORK, ASSIGNOR TO THE CUTLER-HAMMER MFG. CO., OF MILWAUKEE, WISCONSIN, A CORPORATION OF WISCONSIN.

BATTERY-CHARGING APPARATUS.

Application filed January 17, 1920. Serial No. 352,182.

*To all whom it may concern:*

Be it known that I, ALBERT J. HORTON, a citizen of the United States, residing at White Plains, in the county of Westchester and State of New York, have invented new and useful Improvements in Battery-Charging Apparatus, of which the following is a full, clear, concise, and exact description, reference being had to the accompanying drawing, forming a part of this specification.

This invention relates to charging apparatus for storage batteries.

An object of the invention is to provide means for connecting a storage battery to a charging circuit and for protecting the battery against improper connection to its charging circuit.

Another object is to provide means of the aforesaid character which will automatically disconnect the battery from its charging circuit should the voltage of the latter drop below that of the former.

Other objects and advantages of the invention will hereinafter appear.

The accompanying drawing illustrates certain embodiments of the invention which will now be described, it being understood that the invention may be embodied in other forms falling within the scope of the appended claims.

Figure 2:
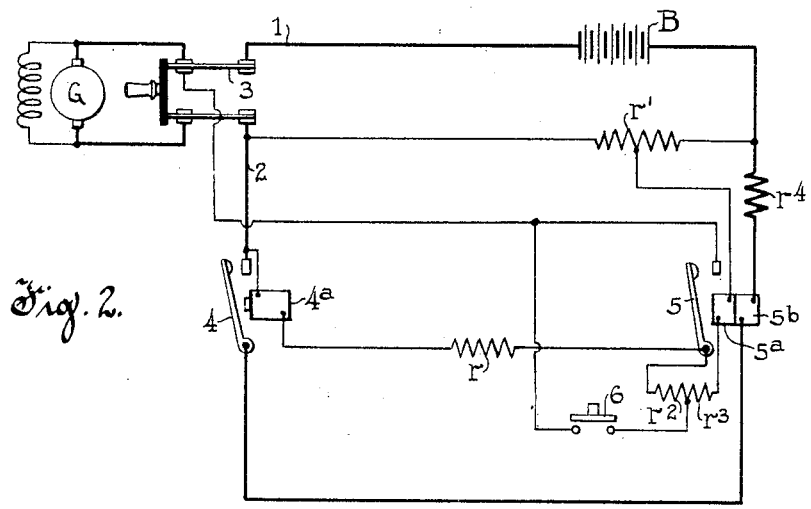

In the drawing,

Figure 1 diagrammatically illustrates one embodiment of the invention; and,

Fig. 2 diagrammatically illustrates a modification thereof.

Referring to Fig. 1 there is illustrated a storage battery B to be connected to a charging circuit 1, 2 supplied by a generator G through a double pole knife switch 3. The battery B is directly connected to one side of the charging circuit while an electromagnetic switch 4 is provided to connect said battery to the opposite side of said circuit, an electromagnetic relay 5 being provided to control the energizing circuit of said switch. The switch 4 is provided with a shunt winding $4^a$ adapted to be connected across the charging circuit by the relay, a resistance $r$ being included in series therewith.

The relay 5 is provided with a shunt winding $5^a$ and series winding $5^b$, the latter being connected between the battery and switch 4. The shunt winding $5^a$ has one terminal connected to line 1 of the charging circuit on the left hand side of the battery while the opposite terminal of said winding is connected through a portion of a resistance $r'$ to the right hand side of said battery and through the remaining portion of resistance $r'$ to line 2 of the charging circuit.

Thus if the battery is so connected between line 1 and resistance $r'$ that upon closure of knife switch 3 its positive and negative terminals are respectively connected to the positive and negative terminals of the generator through said resistance, the shunt winding of relay 5 will be supplied with current from the generator and the battery and will respond to energize switch 4. Switch 4 in responding will complete the charging circuit, i. e., the heavy line circuit, and in so doing will energize the series winding of relay 5 causing said winding to assist in holding said relay closed. On the other hand, if the battery is so connected between line 1 and resistance $r'$ that the knife switch connects the battery and generator terminals of opposite polarity, the point of connection of the shunt winding of the relay to the resistance $r'$ will become a neutral point whereby the voltage impressed on winding $5^a$ will be practically nil, thus rendering the relay unresponsive. Under such conditions the switch 4 will remain open thus preventing completion of the charging circuit.

If after the charging circuit is completed the generator voltage fails or falls so that the battery tends to discharge, the current through the series winding of relay 5 will be reversed causing said winding to oppose the shunt winding, with the result of effecting opening of the relay and de-energization of the switch 4. This will interrupt the charging circuit but with the arrangement shown restoration of the generator voltage to normal will effect re-energization of the relay to again energize switch 4 for reclosing the charging circuit automatically.

Referring to Fig. 2, the same shows all of the aforesaid elements of Fig. 1, said elements being designated by the same reference characters as in Fig. 1. In addition to such elements this figure shows a normally open push button switch 6 for controlling the shunt winding of relay 5, resistances $r^2$ and $r^3$ associated with said relay and a resistance $r^4$, which is provided for a purpose hereinafter set forth and which as will appear may be omitted.

As in Fig. 1, the relay 5 has one terminal of its shunt winding connected to resistance $r'$ at an intermediate point but in this instance its opposite terminal is connected through resistance $r^3$ to the push button switch 6 and through the resistances $r^3$ and $r^2$ in series to its own contact arm. The push button switch 6 is connected directly to line 1 of the charging circuit and when closed establishes for the shunt winding of the relay the same connections as in Fig. 1 except for the inclusion of resistance $r^3$ in series with said winding.

Accordingly if the battery is improperly connected the relay 5 will not respond to the push button switch but if it is properly connected said relay will respond as above described and upon closing will shunt the push button switch to establish a maintaining circuit for its shunt winding, including the resistance $r^2$. Further, said relay in closing will energize the switch 4 to complete the charging circuit and will upon failure or falling of the generator voltage de-energize said switch as above described. Under the latter conditions the relay in opening will interrupt the circuit of its shunt winding, thus necessitating reclosure of the push button switch 6 for re-establishment of the charging circuit. In this instance it is to be noted that the current flowing through the shunt winding of relay 5 is normally reduced by inclusion of the resistances $r^2$ and $r^3$ in series therewith which obviously renders said relay more sensitive to reversals of current through its series winding.

The resistance $r^4$ is provided merely to enable safe charging of a battery whose voltage is less than that of the generator, which is sometimes desired. When such a resistance is employed it is necessary to proportion the values of the sections of resistance $r'$ according to the relative values of the battery and generator voltages.

While it is considered advisable in most instances to utilize the relay and switch above described, it is to be understood that a single switch might be employed in lieu thereof, said switch controlling the charging circuit and being provided with windings and circuit connections like those of relay 5.

What I claim as new and desire to secure by Letters Patent is:

1. In combination, a storage battery, a charging circuit therefor and automatic means for completing a connection between said battery and said circuit, said means including an electro-responsive control winding, resistance and circuit connections for said winding including said resistance to subject said winding to influence by said battery and said charging circuit whereby energization of said winding is rendered dependent upon connection of a given terminal of said battery to a given side of said charging circuit.

2. In combination, a storage battery, a charging circuit therefor and electro-responsive means for establishing a connection therebetween, said means including a winding having connections with said battery and charging circuit and resistance in said connections to render energization of said winding dependent upon connection of each terminal thereof to given terminals of said battery and charging circuit.

3. In combination, a storage battery, a charging circuit therefor, electro-responsive means including a switch for connecting said battery to one side of said circuit, and a circuit shunting said switch and including resistance, said means having a winding thereof connected between the opposite side of said charging circuit and said resistance at a point relative to the latter which is neutral when the battery is improperly connected to the latter side of said charging circuit.

4. In combination, a storage battery, a charging circuit therefor and electromagnetic means to establish a charging connection therebetween, said means including a switch having an operating winding and a holding winding, the latter being included in series with said battery during charging thereof and the former having connections with said charging circuit and said battery including resistance rendering its energization dependent upon connection of the terminals thereof to given terminals of said charging circuit and said battery.

In witness whereof, I have hereunto subscribed my name.

ALBERT J. HORTON.